US009661358B2

(12) United States Patent
Ramakrishnan et al.

(10) Patent No.: US 9,661,358 B2
(45) Date of Patent: *May 23, 2017

(54) SYSTEM AND METHOD OF PROVIDING VIDEO CONTENT

(71) Applicant: AT & T INTELLECTUAL PROPERTY I, L.P., Atlanta, GA (US)

(72) Inventors: Kadangode Ramakrishnan, Berkeley Heights, NJ (US); Charles Robert Kalmanek, Jr., Short Hills, NJ (US); Robert Duncan Doverspike, Tinton Falls, NJ (US); William C. Fenner, Woodside, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 310 days.

This patent is subject to a terminal disclaimer.

(21) Appl. No.: 14/321,265

(22) Filed: Jul. 1, 2014

(65) Prior Publication Data
US 2014/0317672 A1 Oct. 23, 2014

Related U.S. Application Data

(63) Continuation of application No. 11/891,056, filed on Aug. 8, 2007, now Pat. No. 8,813,141.

(51) Int. Cl.
*H04N 7/173* (2011.01)
*H04N 21/231* (2011.01)
(Continued)

(52) U.S. Cl.
CPC ....... *H04N 21/23106* (2013.01); *H04N 7/162* (2013.01); *H04N 21/236* (2013.01);
(Continued)

(58) Field of Classification Search
CPC ......... H04N 21/23106; H04N 21/2625; H04N 21/4384; H04N 21/6405; H04N 21/8453; H04N 21/236; H04N 7/162
See application file for complete search history.

(56) References Cited

U.S. PATENT DOCUMENTS 5,696,774 A * 12/1997 Inoue ................. G11B 20/1833
375/E7.279
8,040,438 B2 * 10/2011 Kim ..................... H04N 5/4401
348/725
(Continued)

*Primary Examiner* — Oschta Montoya
(74) *Attorney, Agent, or Firm* — Toler Law Group, PC

(57) ABSTRACT

A system includes a processor and a memory. The memory stores instructions that, when executed by the processor, cause the processor to perform operations including sending a primary multicast video stream and a secondary multicast video stream to a media device. The secondary multicast video stream is limited to intra-coded frames (I-frames) extracted from the primary multicast video stream. Transmission of each intra-coded frame (I-frame) of the secondary multicast video stream is delayed with respect to transmission of a corresponding I-frame of the primary multicast video stream. The delay is based on an amount of writing time to satisfy a buffer threshold of a video content buffer at the media device to prevent a noticeable time shift of video displayed by the media device when the media device switches from outputting the secondary multicast video stream to outputting the primary multicast video stream.

20 Claims, 4 Drawing Sheets

(51) Int. Cl.
*H04N 7/16* (2011.01)
*H04N 21/262* (2011.01)
*H04N 21/438* (2011.01)
*H04N 21/6405* (2011.01)
*H04N 21/845* (2011.01)
*H04N 21/236* (2011.01)

(52) U.S. Cl.
CPC ..... *H04N 21/2625* (2013.01); *H04N 21/4384* (2013.01); *H04N 21/6405* (2013.01); *H04N 21/8453* (2013.01)

(56) References Cited

U.S. PATENT DOCUMENTS

| | | | | |
|---|---|---|---|---|
| 8,397,269 | B2* | 3/2013 | Barrett | H04N 5/4401 725/114 |
| 8,516,531 | B2* | 8/2013 | Hearn | H04N 7/17318 348/114 |
| 2002/0120942 | A1* | 8/2002 | Avison | H04N 7/17336 725/135 |
| 2003/0196211 | A1* | 10/2003 | Chan | H04N 21/23436 725/131 |
| 2004/0003399 | A1* | 1/2004 | Cooper | H04N 5/4401 725/38 |
| 2004/0071088 | A1 | 4/2004 | Curcio et al. | |
| 2006/0075428 | A1 | 4/2006 | Farmer et al. | |
| 2006/0085828 | A1 | 4/2006 | Dureau et al. | |
| 2006/0095472 | A1 | 5/2006 | Krikorian et al. | |
| 2006/0123445 | A1 | 6/2006 | Sullivan et al. | |
| 2006/0230176 | A1* | 10/2006 | Dacosta | H04L 29/06027 709/235 |
| 2008/0192631 | A1* | 8/2008 | Ardhanari | H04L 47/10 370/230.1 |
| 2008/0216116 | A1 | 9/2008 | Pekonen et al. | |
| 2009/0066852 | A1* | 3/2009 | Dai | H04N 5/50 348/731 |

* cited by examiner

US 9,661,358 B2

SYSTEM AND METHOD OF PROVIDING VIDEO CONTENT

PRIORITY CLAIM

This application is a continuation of, and claims priority to, U.S. patent application Ser. No. 11/891,056 filed on Aug. 8, 2007, and entitled "SYSTEM AND METHOD OF PROVIDING VIDEO CONTENT," which is incorporated herein by reference in its entirety.

FIELD OF THE DISCLOSURE

The present disclosure is generally related to systems and methods of providing video content.

BACKGROUND

Television viewing is part of daily life for many people. Certain networks that provide video content may experience limitations that lead to an undesirable television viewing experience. For example, viewers may experience channel change latency after switching channels, as video content of a new channel is sent to and buffered by a receiving device. Hence, there is a need for an improved system and method of providing video content.

DETAILED DESCRIPTION OF THE DRAWINGS

Figure 1:
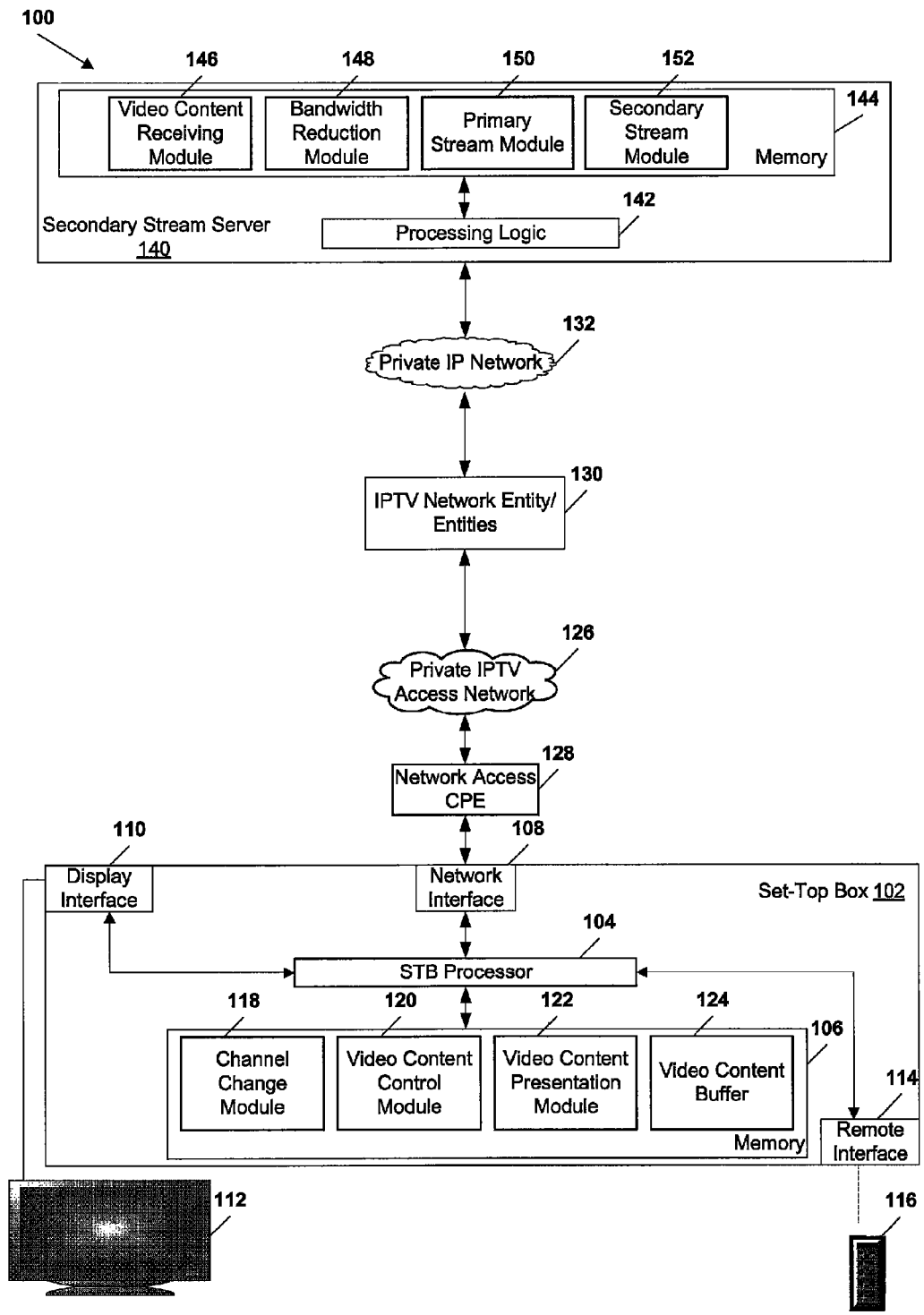
FIG. 1 is a block diagram of a particular embodiment of a system to provide video content.

A system to provide video content is disclosed that includes processing logic and memory accessible to the processing logic. The memory includes instructions executable by the processing logic to receive a join request from a set-top box device. The join request indicates a request to join a multicast group associated with a particular channel. The memory also includes instructions executable by the processing logic to send a primary multicast video stream associated with the particular channel to the set-top box device via a network. Further, the memory includes instructions executable by the processing logic to send a secondary multicast video stream associated with the particular channel to the set-top box device in addition to the primary multicast video stream via the network. The secondary multicast video stream provides lower quality video content than the primary multicast video stream. In addition, frames of the secondary multicast video stream are delayed with respect to corresponding frames of the primary multicast video stream, such that there is no noticeable time shift when the set-top box device switches from the secondary multicast video stream to the primary multicast video stream.

In another embodiment, a set-top box device is disclosed that includes a processor and memory accessible to the processor. The memory includes a channel change module executable by the processor to receive a channel change selection indicating a particular channel and to send a join request to an Internet Protocol Television Network (IPTV) network entity. The join request indicates a request to join a multicast group associated with the particular channel. The memory also includes a video content control module executable by the processor to receive a primary multicast video stream associated with the particular channel from the IPTV network entity. Further, the video content control module may be executable by the processor to receive a secondary multicast video stream associated with the particular channel from the IPTV network entity in addition to the primary multicast video stream. The secondary multicast video stream provides lower quality video content than the primary multicast video stream. In addition, frames of the secondary multicast video stream are delayed with respect to corresponding frames of the primary multicast video stream, such that there is no noticeable time shift when the set-top box device switches from the secondary multicast video stream to the primary multicast video stream.

In another embodiment, a method of providing video content is disclosed that includes receiving video content associated with a television stream from a video source at a server of a video distribution network. Further, the method includes sending a primary multicast video stream corresponding to the video content to a video distribution network entity via an Internet Protocol (IP) network. The primary multicast video stream is associated with a first bandwidth. In addition, the method includes sending a secondary multicast video stream to the video distribution network entity via the IP network. The secondary multicast video stream is associated with a second bandwidth. The primary multicast video stream and the secondary multicast video stream are accessible to a set-top box device via the video distribution network entity in response to a channel change request that indicates the television stream. In addition, the frames of the secondary multicast video stream are delayed with respect to corresponding frames of the primary multicast video stream, such that there is no noticeable time shift when the set-top box device switches from the secondary multicast video stream to the primary multicast video stream.

In another embodiment, a method of providing video content is disclosed that includes receiving a channel change selection at a set-top box device. The method also includes sending a channel change request from the set-top box device to an Internet Protocol Television (IPTV) network entity. The channel change request indicates a requested channel. In addition, the method includes receiving a primary multicast video stream associated with the requested channel at the set-top box device from the IPTV network entity. Further, the method includes receiving a secondary multicast video stream associated with the requested channel at the set-top box device from the IPTV network entity in addition to the primary multicast video stream. The secondary multicast video stream provides lower quality video content than the primary multicast video stream. In addition, frames of the secondary multicast video stream are delayed with respect to corresponding frames of the primary multicast video stream such that there is no noticeable time shift when the set-top box device switches from the secondary multicast video stream to the primary multicast video stream.

In another embodiment, a computer-readable medium is disclosed having instructions to cause a processor to execute a method that includes receiving video content associated with a television stream from a video source at a server of a video distribution network. The computer-readable medium also includes instructions to cause the processor to execute a method that includes sending a primary multicast video stream corresponding to the video content to a video distribution network entity via an Internet Protocol (IP) network and sending a secondary multicast video stream to the video distribution network entity via the IP network. The primary multicast video stream is associated with a first bandwidth and the secondary multicast video stream is associated with a second bandwidth. The primary multicast video stream and the secondary multicast video stream are accessible to a set-top box device via the video distribution network entity in response to a channel change request that indicates the television stream. In addition, frames of the secondary multicast video stream are delayed with respect to corresponding frames of the primary multicast video stream, such that there is no noticeable time shift when the set-top box device switches from the secondary multicast video stream to the primary multicast video stream.

FIG. 1 is a block diagram illustrating an embodiment of a system 100 to provide video content. The system 100 includes a set-top box device (STB) 102 that communicates with one or more Internet Protocol Television (IPTV) network entities 130 via a network, such as a private IPTV access network 126. The one or more additional IPTV network entities 130 may include a Digital Subscriber Line Access Multiplexer (DSLAM), an intermediate office switch or router, a central office switch or router, or any combination thereof. The private IPTV access network 126 may include a very high data rate digital subscriber line (VDSL) loop or fiber optic line, including Broadband Passive Optical Network (B-PON), Gigabit Passive Optical Network (G-PON), or other similar access-network fiber optics technologies.

The one or more IPTV network entities 130 communicate with a server, such as the secondary stream server 140, via an Internet Protocol network, such as a private Internet Protocol (IP) network 132. The secondary stream server 140 may include an intermediate office server, a central office server, a distribution server (D-Server) at a video head-end office (VHO), or any combination thereof. The secondary stream server 140 may communicate with the one or more IPTV network entities 130 via at least one local area network (LAN) connection, such as 1, 10, or higher rate Gigabit Ethernet (GigE) connection.

The set-top box device 102 includes a STB processor 104 and a memory 106 accessible to the STB processor 104. The STB processor 104 can communicate video content to a display device 112 via a display interface 110. In addition, the STB processor 104 may communicate with a remote control device 116 via a remote interface 114. In a particular embodiment, the STB processor 104 may communicate with the private IPTV access network 126 via a network interface 108. In an illustrative, non-limiting embodiment, a customer premises equipment (CPE) 128 may facilitate communication between the network interface 108 and the private IPTV access network 126. The CPE 128 may include a router, a local area network device, a modem, such as a digital subscriber line (DSL) modem, a residential gateway, any other suitable device for facilitating communication between the network interface 108 of the set-top box device 102 and the private IPTV access network 126, or any combination thereof.

In a particular embodiment, the memory 106 includes a channel change module 118 that is executable by the STB processor 104 to receive a channel change selection from an input device, such as the remote control device 116. The channel change module 118 may also be executable by the STB processor 104 to send a channel change request to an IPTV network entity 130 in response to receiving the channel change selection. The channel change request may indicate a television channel requested at the set-top box device 102. In an illustrative embodiment, the channel change module 118 may be executable by the STB processor 104 to translate the channel change selection to a multicast group identification number and the channel change request may include a request to join a multicast group associated with the requested television channel. For example, the channel change module 118 may be executable by the STB processor 104 to send a request to join a multicast group associated with a primary multicast video stream of the requested channel, to send a request to join a multicast group associated with a secondary multicast video stream of the requested channel, or any combination thereof. In an illustrative, non-limiting embodiment, the join request may include an Internet Group Management Protocol (IGMP) join request.

The secondary multicast video stream may be associated with a different bandwidth than the primary multicast video stream. For example, the secondary multicast video stream may require a lower bandwidth than the primary multicast video stream. The secondary multicast video stream may provide lower quality video content than the primary multicast video stream due to the reduced bandwidth of the secondary multicast video stream. In an illustrative embodiment, the secondary multicast video stream may be associated with a reduced bandwidth because the secondary multicast video stream includes intra-coded frames (I-frames) extracted from the primary multicast video stream without the corresponding predicted frames (P-frames) and bi-predictive frames (B-frames). In an illustrative, non-limiting embodiment, the secondary multicast video stream may include I-frames extracted from the primary multicast video stream with the high frequency components removed.

Upon receiving a request to join a multicast group from the set-top box device 102, an IPTV network entity 130, such as a Digital Subscriber Line Access Multiplexer (DSLAM), may be operable to identify whether or not the IPTV network entity 130 is included in the multicast group. The multicast group may include a primary multicast video stream multicast group, a secondary multicast video stream multicast group, or any combination thereof, associated with a requested channel. If the IPTV network entity 130 is included in the multicast group, then the IPTV network entity 130 may be operable to add the set-top box device 102 to the multicast group. For example, the IPTV network entity 130 may be operable to add an interface that communicates with the set-top box device 102 to a list of interfaces included in the multicast group. The IPTV network entity 130 may then be operable to forward the video stream corresponding to the multicast group, such as a primary multicast video stream, a secondary multicast video stream, or any combination thereof, to the set-top box device 102 via the interface. If the IPTV network entity 130 is not included in the multicast group, then the IPTV network entity 130 is operable to forward the join request to a subsequent IPTV network entity, such as an intermediate office router or switch, a central office router or switch, or any combination thereof. The process of identifying whether or not a particular IPTV network entity is included in the multicast group and forwarding the join request to a subsequent IPTV network entity continues until a particular IPTV network entity is identified that is included in the multicast group or until a distribution server (D-server) receives the join request.

In a particular embodiment, the memory 106 includes a video content control module 120 that is executable by the STB processor 104 to receive a primary multicast video stream associated with the requested channel from the IPTV network entity 130. The video content control module 120 is also executable by the STB processor 104 to receive a secondary multicast stream associated with the requested channel from the IPTV network entity 130. The secondary multicast video stream may have its frames delayed with respect to the corresponding frames of the primary multicast video stream. This insures that, after sufficient buffering of primary frames, when the set-top box switches to the primary multicast video stream there will be no noticeable time shift. In an illustrative embodiment, the delay between the primary multicast video stream and the secondary multicast video stream may be based on an amount of time required to fill all or part of a buffer associated with the set-top box device 102, such as the video content buffer 124, with the primary multicast video stream. For example, the video content buffer 124 may be filled to a threshold amount that relates to a percentage of the total memory associated with the video content buffer 124 that corresponds to a sufficient amount of video content to prevent an underflow event from occurring.

In an illustrative embodiment, the video content control module 120 may be executable by the STB processor 104 to send a stop indication to the IPTV network entity 130 when the primary multicast video stream has filled all or part of the video content buffer 124. The stop indication may include a request to leave a multicast group associated with the secondary multicast video stream.

Upon receiving a request to leave a multicast group from the set-top box device 102, an IPTV network entity 130, such as a DSLAM, may be operable to remove an interface that communicates with the set-top box device 102 from the list of interfaces that are included in the multicast group. The leave request may relate to a primary multicast video stream multicast group, a secondary multicast video stream multicast group, or any combination thereof. The IPTV network entity 130 is also operable to identify if there are any other interfaces at the IPTV network entity 130 that are included in the multicast group. If other interfaces at the IPTV network entity 130 are included in the multicast group, then the leave request is not forwarded to a subsequent IPTV network entity. If there are no other interfaces at the IPTV network entity 130 that are included in the multicast group, then the IPTV network entity 130 may be operable to forward the leave request to a subsequent IPTV network entity, such as an intermediate office router or switch, a central office router or switch, or any combination thereof. Each subsequent IPTV network entity that receives a leave request is operable to remove the interface that received the leave request from the multicast group and to forward the leave request until a subsequent IPTV network entity is included in the multicast group or until a distribution server (D-server) receives the leave request.

In a particular embodiment, the set-top box device 102 includes a video content presentation module 122 that is executable by the STB processor 104 to provide the primary multicast video stream to the video content buffer 124. The video content presentation module 122 is also executable by the STB processor 104 to provide the secondary multicast video stream to a display device coupled to the set-top box device 102, such as the display device 112. In an illustrative embodiment, the video content presentation module 122 is executable by the STB processor 104 to provide the secondary multicast video stream to the display device 112 while the primary multicast video stream is provided to the video content buffer 124. Further, the video content presentation module 122 is executable by the STB processor 104 to switch from providing the secondary multicast video stream to the display device 112 to providing the primary multicast video stream to the display device 112 when the primary multicast video stream has filled the video content buffer 124.

In a particular embodiment, the secondary stream server 140 includes processing logic 142 and memory 144 that is accessible to the processing logic 142. The memory 144 includes a video content receiving module 146 that is executable by the processing logic 142 to receive video content from a video source, such as a satellite acquisition system, a satellite head-end, a video on-demand source, such as movie studios and programmers of non-live video content, another video distribution network entity, such as a video head-end office (VHO) or intermediate office, or any combination thereof. The video content may relate to a television channel that is requested by the set-top box device 102 via the IPTV network entity 130.

In a particular embodiment, the memory 144 includes a bandwidth reduction module 148 that is executable by the processing logic 142 to reduce the bandwidth of the received video content. In an illustrative embodiment, the bandwidth reduction module may be executable by the processing logic 142 to extract a plurality of I-frames from the video content received at the secondary stream server 140. In an illustrative, non-limiting embodiment, the bandwidth reduction module 148 may be executable by the processing logic 142 to remove the high frequency components from the I-frames associated with the video content.

In a particular embodiment, the memory 144 includes a primary stream module 150 that is executable by the processing logic 142 to send a primary multicast video stream corresponding to video content received at the secondary stream server 140 to the IPTV network entity 130, via the private IP network 132. The primary multicast video stream may include video content of a television channel requested by the set-top box device 102. In an illustrative embodiment, the primary stream module 150 may be executable by the processing logic 142 to send the primary multicast video stream to the IPTV network entity 130 in response to receiving a request to join a multicast group associated with the primary multicast video stream from the IPTV network entity 130. Additionally, the primary stream module 150 may be executable by the processing logic 142 to stop sending the primary multicast video stream to the IPTV network entity 130 in response to receiving a leave request from the IPTV network entity 130 to remove the IPTV network entity 130 from the primary multicast video stream multicast group.

The memory 144 may also include a secondary stream module 152 that is executable by the processing logic 142 to send a secondary multicast video stream to the IPTV network entity 130 via the private IP network 132. The secondary multicast video stream may include video content of a television channel requested by the set-top box device 102 and the secondary multicast video stream may be associated with a lower bandwidth than the primary multicast video stream. For example, the secondary multicast video stream may include I-frames extracted from the video content associated with the requested television channel without the corresponding B-frames and P-frames of the video content. In an illustrative, non-limiting embodiment, the secondary stream module 152 may be executable by the processing logic 142 to send the secondary multicast video stream to the IPTV network entity 130 at the same or reduced rate as the primary multicast video stream. In addition, the secondary stream module 152 may be executable by the processing logic 142 to stop sending the secondary multicast video stream to the IPTV network entity 130 in response to receiving a request from the IPTV network entity 130 to remove the IPTV network entity 130 from the secondary multicast video stream multicast group. The secondary multicast video stream may be delayed with respect to the primary multicast video stream. The delay may relate to an estimated amount of time required to fill the video content buffer of the set-top box device, such as the video content buffer 124, with the primary multicast video stream. This insures that when the set-top box switches to the primary multicast video stream that there will be no noticeable time shift.

In an illustrative embodiment, the secondary stream module 152 may be executable by the processing logic 142 to send the secondary multicast video stream to the IPTV network entity 130 in response to receiving a request to join a multicast group associated with the primary multicast video stream from the IPTV network entity 130. In another illustrative embodiment, the secondary stream module 152 may be executable by the processing logic 142 to send the secondary multicast video stream to the IPTV network entity 130 in response to a request to join a multicast group associated with the secondary multicast video stream from the IPTV network entity 130. In an illustrative, non-limiting embodiment, the secondary stream module 152 may be executable by the processing logic 142 to send a plurality of secondary multicast video streams to the IPTV network entity 130 without receiving any join requests. The plurality of secondary multicast video streams may be chosen by a video content provider based on the most watched channels for a specified region (e.g. local, regional, national) or a second multicast video stream may be provided to the IPTV network entity 130 for each television channel offered by the video content provider. For example, the plurality of secondary multicast video streams may be continuously provided to a central office to reduce channel change latency by decreasing the distance that a join request and corresponding secondary multicast video stream travel in response to a channel change selection at a set-top box device served by the central office.

For ease of explanation, the various modules 118-124 and 146-152 have been described in terms of processor-executable instructions. However, those skilled in the art will appreciate that such modules can be implemented as hardware logic, processor-executable instructions, or any combination thereof.

Figure 2:
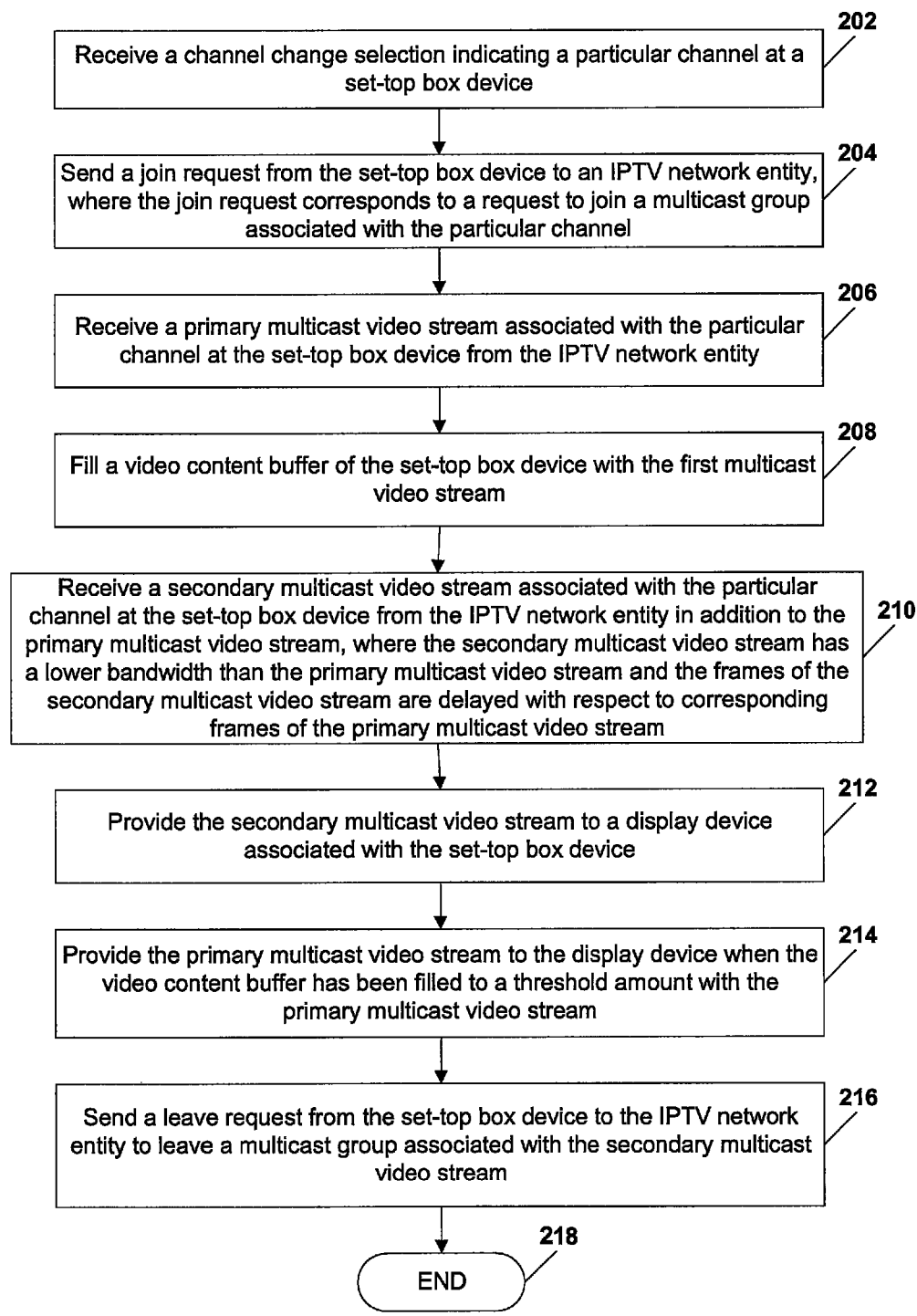
FIG. 2 is a flow diagram of a particular embodiment of a method of providing video content.

FIG. 2 is a flow diagram of a particular embodiment of a method of providing video content. At block 202, a channel change selection indicating a particular channel is received at a set-top box device. Moving to block 204, a join request is sent from the set-top box device to an IPTV network entity, such as a Digital Subscriber Line Access Multiplexer (DSLAM), a central office router or switch, an intermediate office router or switch, a distribution server (D-Server), or any combination thereof. The join request corresponds to a request to join a multicast group associated with the particular channel. Proceeding to block 206, a primary multicast video stream associated with the particular channel is received at the set-top box device from the IPTV network entity.

At block 208, a video content buffer of the set-top box device is filled with the first multicast video stream. Moving to block 210, a secondary multicast video stream associated with the particular channel is received at the set-top box device from the IPTV network entity in addition to the primary multicast video stream. The bandwidth of the secondary multicast video stream may be lower than the bandwidth of the primary multicast video stream. The secondary multicast video stream may provide lower quality video content than the primary multicast video stream due to the lower bandwidth of the secondary multicast video stream. Additionally, frames of the secondary multicast video stream are delayed with respect to corresponding frames of the primary multicast video stream. The delay may relate to an estimated amount of time required to fill the video content buffer of the set-top box device to a threshold amount with the primary multicast video stream. This insures that when the set-top box switches to the primary multicast video stream that there will be no noticeable time shift. The set-top box device may receive the primary multicast video stream and the secondary multicast video stream via a network, such as a public Internet Protocol (IP) network, a private IP network, or any combination thereof.

Proceeding to block 212, the secondary multicast video stream is provided to a display device associated with the set-top box device. At block 214, the primary multicast video stream is provided to the display device when the video content buffer has been filled to a threshold amount with the primary multicast video stream and the secondary multicast video stream is no longer provided to the display device. Moving to block 216, a leave request is sent from the set-top box device to the IPTV network entity to leave a multicast group associated with the secondary multicast video stream. The method terminates at 218.

Figure 3:
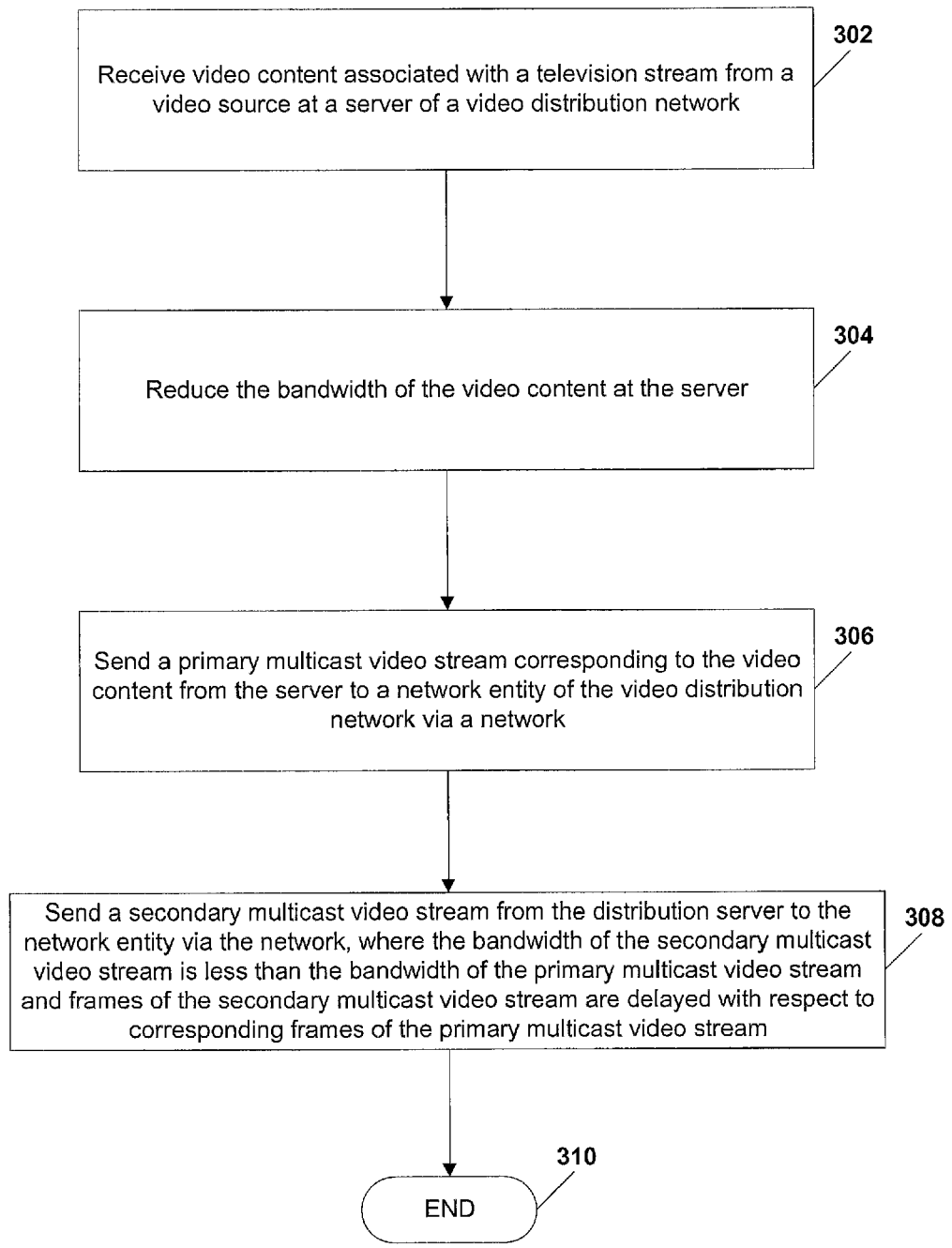
FIG. 3 is a flow diagram of a second particular embodiment of a method of providing video content.

FIG. 3 is a flow diagram of a second particular embodiment of a method of providing video content. At block 302, a server of a video distribution network receives video content associated with a television stream from a video source. The server may be included in a central office of the video distribution network, an intermediate office of the video distribution network, a video head-end office (VHO) of the video distribution network, or any combination thereof. Moving to block 304, the server reduces the bandwidth associated with the video content. For example, the server may extract a plurality of I-frames from the video content to provide a reduced bandwidth video content stream.

Proceeding to block 306, the server sends a primary multicast video stream corresponding to the video content to a network entity of the video distribution network via a network. The join request may be received at an interface of the server that is associated with the network entity. In addition, the network may be a public Internet Protocol (IP) network, a private IP network, or any combination thereof. At block 308, the distribution server sends a secondary multicast video stream to the network entity via the network. The secondary multicast video stream has a lower bandwidth than the primary multicast video stream. For example, the secondary multicast video stream may include the plurality of I-frames extracted from the video content. The primary multicast video stream and the secondary multicast video stream may be accessible to a set-top box device via the network entity in response to a channel change request that indicates the television stream. Further, the frames of the secondary multicast video stream are delayed with respect to corresponding frames of the primary multicast video stream. The delay ensures that there will be no noticeable time shift when the set-top box device switches from providing the secondary multicast video stream to a display device to providing the primary multicast video stream to the display device. The method terminates at 310.

Figure 4:
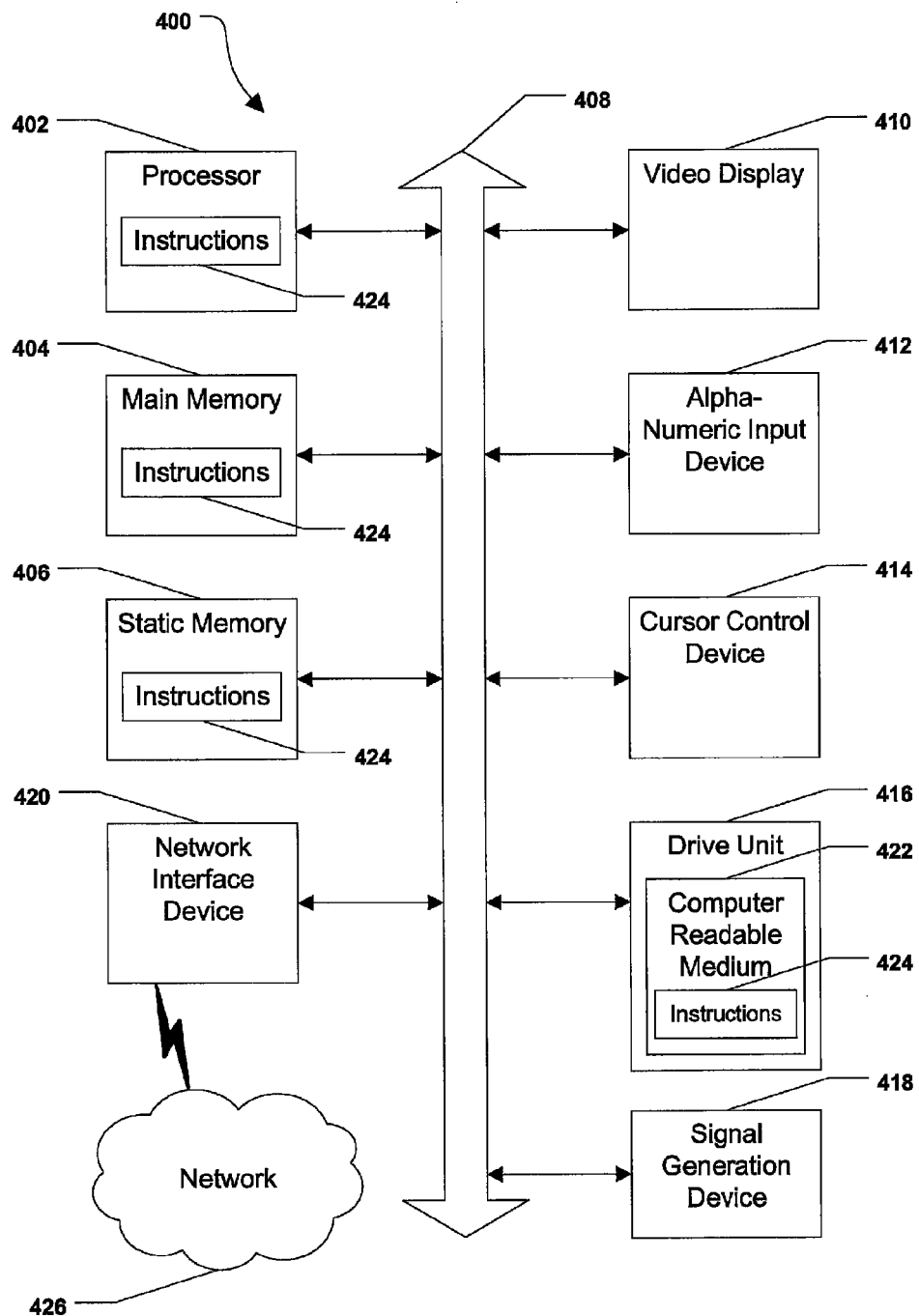
FIG. 4 is a block diagram of an illustrative embodiment of a general computer system.

Referring to FIG. 4, an illustrative embodiment of a general computer system is shown and is designated 400.

The computer system 400 can include a set of instructions that can be executed to cause the computer system 400 to perform any one or more of the methods or computer based functions disclosed herein. The computer system 400, or any portion thereof, may operate as a standalone device or may be connected, e.g., using a network, to other computer systems or peripheral devices, including a secondary stream server, one or more IPTV network entities, or a set-top box device, as shown in FIG. 1.

In a networked deployment, the computer system may operate in the capacity of an IPTV server, such as a video server or application server, or a set-top box device. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics-processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A server comprising:
a processor; and
a memory storing instructions that, when executed by the processor, cause the processor to perform operations comprising:
sending a primary multicast video stream corresponding to a particular channel to a media device; and
sending a secondary multicast video stream to the media device,
wherein the secondary multicast video stream is limited to a plurality of intra-coded frames (I-frames) extracted from the primary multicast video stream, and
wherein transmission of each intra-coded frame (I-frame) of the secondary multicast video stream is delayed with respect to transmission of a corresponding I-frame of the primary multicast video stream based on an amount of writing time to satisfy a buffer threshold of a video content buffer at the media device to prevent a noticeable time shift of video displayed by the media device when the media device switches from outputting the secondary multicast video stream to outputting the primary multicast video stream.

2. The server of claim 1, wherein the primary multicast video stream is associated with a higher bandwidth than the secondary multicast video stream.

3. The server of claim 1, wherein the operations further comprise:
receiving video content associated with a television stream from a video source, wherein the video content includes a plurality of channels; and
receiving a channel change request from the media device, wherein the channel change request indicates a requested channel of the plurality of channels,
wherein the primary multicast video stream and the secondary multicast video stream are sent to the media device based on receiving the channel change request.

4. The server of claim 3, wherein the particular channel corresponds to the requested channel.

5. The server of claim 1, wherein the operations further comprise:
receiving video content associated with a plurality of television streams from a video source, wherein the video content of a particular television stream corresponds to a plurality of channels, and wherein the plurality of channels includes the particular channel;
extracting an additional plurality of I-frames from the video content associated with each of a plurality of additional television streams to produce an additional secondary multicast video stream for each respective additional television stream; and
sending each additional secondary multicast video stream to a video distribution network entity, wherein each additional secondary multicast video stream is limited to the additional plurality of I-frames extracted from the video content associated with the corresponding television stream.

6. The server of claim 5, wherein the primary multicast video stream and the secondary multicast video stream are sent to the media device via the video distribution network entity.

7. The server of claim 1, wherein the operations further comprise sending a plurality of secondary multicast video streams to a video distribution network entity, wherein the plurality of secondary multicast video streams are sent to the video distribution network entity without receiving a request to join a multicast group.

8. The server of claim 7, wherein the operations further comprise determining the plurality of secondary video streams based on a region.

9. The server of claim 7, wherein the plurality of secondary multicast video streams is chosen based on popularity of video content associated with the plurality of secondary multicast video streams.

10. The server of claim 1, wherein high frequency components associated with the plurality of I-frames are not included in the secondary multicast video stream.

11. The server of claim 1, wherein the operations further comprise receiving the buffer threshold from the media device.

12. The server of claim 1, wherein the secondary multicast video stream is sent to the media device at a same rate that the primary multicast video stream is sent to the media device.

13. A system comprising:
a processor;
a video content buffer; and
a memory storing instructions that, when executed by the processor, cause the processor to perform operations comprising:
receiving a primary multicast video stream associated with a particular channel from a video distribution network entity, wherein the primary multicast video stream is provided to the video content buffer; and
receiving a secondary multicast video stream associated with the particular channel from the video distribution network entity, the secondary multicast video stream providing lower bandwidth video content than the primary multicast video stream,
wherein transmission from the video distribution network entity of each frame of the secondary multicast video stream is delayed with respect to a corresponding frame of the primary multicast video stream based on an amount of writing time to satisfy a buffer threshold of the video content buffer to prevent a noticeable time shift of video displayed by a display device when the processor switches from outputting the secondary multicast video stream to outputting the primary multicast video stream.

14. The system of claim 13, wherein the operations further comprise, prior to receiving the primary multicast video stream and the secondary multicast video stream:
sending information associated with the buffer threshold to the video distribution network entity;
receiving a channel change selection; and
sending a channel change request to the video distribution network entity, the channel change request indicating a requested channel, wherein the particular channel corresponds to the requested channel.

15. The system of claim 13, wherein the operations further comprise:
determining whether the buffer threshold is satisfied;
in response to determining that the buffer threshold is not satisfied, providing the secondary multicast video stream to the display device; and
in response to determining that the buffer threshold is satisfied:
providing the primary multicast video stream to the display device; and
sending a leave request to the video distribution network entity, the leave request corresponding to a request to be removed from a multicast group associated with the secondary multicast video stream.

16. The system of claim 13, wherein the video distribution network entity includes a digital subscriber line access multiplexer, a central office router or switch, an intermediate office router or switch, a distribution server, or any combination thereof.

17. A computer-readable storage device storing instructions that when executed by a processor, cause the processor to perform operations comprising:
receiving a primary multicast video stream associated with a particular channel from a video distribution network entity, wherein the primary multicast video stream is provided to a video content buffer; and
receiving a secondary multicast video stream associated with the particular channel from the video distribution network entity, the secondary multicast video stream providing lower bandwidth video content than the primary multicast video stream,
wherein transmission from the video distribution network entity of each frame of the secondary multicast video stream is delayed with respect to a corresponding frame of the primary multicast video stream based on an amount of writing time to satisfy a buffer threshold of the video content buffer to prevent a noticeable time shift of video displayed by a display device when the processor switches from outputting the secondary multicast video stream to outputting the primary multicast video stream.

18. The computer-readable storage device of claim 17, wherein the operations further comprise, prior to receiving the primary multicast video stream and the secondary multicast video stream:
receiving a channel change selection indicating a requested channel;
sending a join request to the video distribution network entity, wherein the join request includes a request to join a multicast group associated with the primary multicast video stream and a request to join a multicast group associated with the secondary multicast video stream; and
sending information associated with the buffer threshold to the video distribution network entity.

19. The computer-readable storage device of claim 18, wherein the operations further comprise:
determining whether the buffer threshold is satisfied;
in response to determining that the buffer threshold is satisfied:
providing the primary multicast video stream to the display device in response to determining that the buffer threshold is satisfied; and
sending a leave request to the video distribution network entity, the leave request corresponding to a request to be removed from the multicast group associated with the secondary multicast video stream; and
in response to determining that the buffer threshold is not satisfied, providing the secondary multicast video stream to the display device.

20. The computer-readable storage device of claim 17, wherein the buffer threshold is satisfied when memory associated with the video content buffer is full.

* * * * *